US005584176A

United States Patent [19]
Meyer et al.

[11] Patent Number: 5,584,176
[45] Date of Patent: Dec. 17, 1996

[54] ENGINE CONTROL TO ACHIEVE RAPID CATALYST WARM-UP

[75] Inventors: Daniel L. Meyer, Dearborn; Douglas R. Hamburg, Bloomfield; Philip W. Husak, Southgate; Steven R. Whittier, Saline, all of Mich.

[73] Assignee: Ford Motor Company, Dearborn, Mich.

[21] Appl. No.: 363,055

[22] Filed: Dec. 23, 1994

[51] Int. Cl.⁶ ..................................... F01N 3/20
[52] U.S. Cl. ................. 60/274; 60/276; 60/277; 60/284; 60/285
[58] Field of Search .............. 60/274, 276, 277, 60/285, 284

[56] References Cited

U.S. PATENT DOCUMENTS

| 4,144,853 | 3/1979 | Maruoka et al. |
| 4,936,276 | 6/1990 | Gopp. |
| 5,050,551 | 9/1991 | Morikawa ................. 60/285 |
| 5,182,907 | 2/1993 | Kuroda ..................... 60/277 |
| 5,203,300 | 4/1993 | Orzel. |
| 5,211,011 | 5/1993 | Nishikawa et al. ........ 60/284 |
| 5,228,421 | 7/1993 | Orzel. |
| 5,253,631 | 10/1993 | Curran. |
| 5,263,318 | 11/1993 | Oota ......................... 60/284 |
| 5,329,764 | 7/1994 | Hamburg et al. .......... 60/285 |
| 5,357,749 | 10/1994 | Ohsuga ..................... 60/276 |

FOREIGN PATENT DOCUMENTS

0499207A1  8/1992  European Pat. Off..

Primary Examiner—Douglas Hart
Attorney, Agent, or Firm—Allan J. Lippa

[57] ABSTRACT

A system and method to control the ignition timing of engine (28) are used to rapidly warm a catalytic converter (52). A controller (8) calculates (402) hydrocarbon efficiency of the converter (52) from a ratio of the integrals of hydrocarbon sensors respectively positioned downstream (48) and upstream (46) of the converter (52). The controller retards ignition timing to a value retarded from nominal ignition timing (416, 426) when the calculated hydrocarbon efficiency is less than a desired efficiency (418).

9 Claims, 6 Drawing Sheets

ENGINE CONTROL TO ACHIEVE RAPID CATALYST WARM-UP

BACKGROUND OF THE INVENTION

The field of the invention relates to increasing the warm-up rate of the catalytic converter after engine start by controlling the engine's ignition timing and air/fuel ratio.

It is known to retard engine ignition timing for a predetermined time after engine start to more rapidly warm-up the catalytic converter. U.S. Pat. No. 4,144,853 discloses a system in which ignition timing is retarded until a temperature measurement of the catalytic converter reaches a predetermined temperature.

The inventors herein have recognized numerous problems with the above approaches. For example, engine power and fuel economy are reduced while the ignition timing is retarded. If ignition timing is retarded longer than necessary to achieve a desired catalytic converter efficiency, fuel economy and engine power are needlessly wasted.

SUMMARY OF THE INVENTION

An object of the invention claimed herein is to rapidly warm the converter using ignition control while minimizing any loss in engine power or fuel economy during the warm-up period.

The problems of prior approaches are overcome and the objects and advantages of the claimed invention achieved, by providing both a system and control method for an internal combustion engine having its exhaust coupled to a catalytic converter. In one particular aspect of the invention, the control method comprises the steps of: providing an indication of hydrocarbons downstream of the converter; calculating hydrocarbon efficiency of the converter from the hydrocarbon indication; and retarding ignition timing to a value retarded from nominal ignition timing when the calculated hydrocarbon efficiency is less than a desired efficiency.

Preferably, the step of calculating converter efficiency is further responsive to an indication of hydrocarbons upstream of the converter. And, preferably, the step of calculating converter efficiency further comprises a step calculating a ratio of an integral of a downstream hydrocarbon indication to an integral of the upstream hydrocarbon indication.

An advantage of the above aspect of the invention is that ignition timing is retarded only until an actual indication of hydrocarbon efficiency of the converter indicates such hydrocarbon efficiency has reached a desired efficiency. Unnecessary loss in engine power and fuel economy during the warm-up period are thereby avoided.

In another aspect of the invention, the control system comprises: a first and a second hydrocarbon sensor respectively positioned upstream and downstream of the converter; a controller calculating hydrocarbon efficiency of the converter from output signals from the first and the second hydrocarbon sensors; the controller retarding ignition timing to a value retarded from nominal ignition timing when the calculated hydrocarbon efficiency is less than a desired efficiency; and the controller offsetting a fuel command for delivering fuel to the engine by a predetermined amount in a lean direction during a period after engine start to shift engine exhaust gas mixture towards a preselected air/fuel ratio lean of stoichiometry by a preselected amount.

Preferably, the control system comprises the control system recited in claim 14 wherein the period comprises a first portion and a later occurring second portion, the controller adaptively learning the correction value during the second portion of the period from a feedback signal derived from the exhaust gas oxygen sensor and correcting the offset fuel command by the correction value so that the exhaust gas mixture is shifted more closely to the preselected air/fuel ratio.

An advantage of the above aspect of the invention is that ignition timing is retarded only until an actual calculation of hydrocarbon efficiency indicates the desired efficiency is achieved. Another advantage if that a lean shift in engine air/fuel ratio is obtained thereby providing rapid converter warm-up without incurring rough engine operation. Still another advantage is that the engine air/fuel ratio is actually shifted to a desired lean value by adaptive learning which eliminates any shift errors thereby providing rapid converter warm-up without incurring rough engine operation.

BRIEF DESCRIPTION OF THE DRAWINGS

The object and advantages of the claimed invention will become more readily apparent from the following detailed description of an example of operation described with reference to the drawings wherein:

DESCRIPTION OF AN EXAMPLE OF OPERATION

Figure 1:
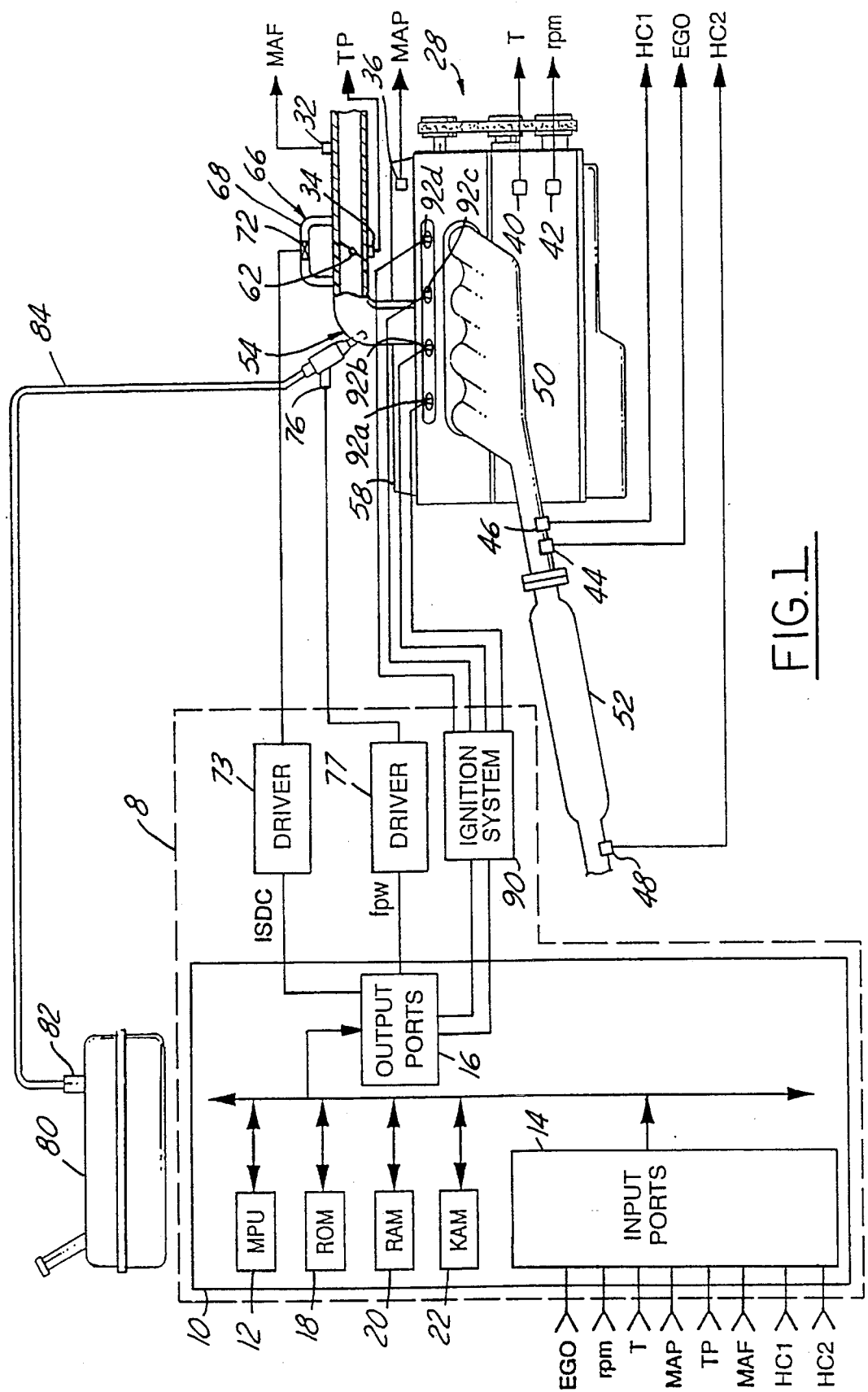
FIG. 1 is a block diagram of an embodiment in which the invention is used to advantage.

Controller 8 is shown in the block diagram of FIG. 1 including conventional microcomputer 10 having: microprocessor unit 12; input ports 14; output ports 16; read only memory 18, for storing control programs; random access memory 20, for temporary data storage which may also be used for counters or timers; keep-alive memory 22, for storing learned values; and a conventional data bus. As described in greater detail later herein, controller 8 controls operation of engine 28 by the following control signals; pulse width signal fpw for controlling liquid fuel delivery via drivers 77; idle speed duty cycle signal ISDC for controlling engine idle speed via drivers 73; and conventional distributorless ignition system 90 for providing ignition current to spark plugs 92a–d.

Controller 8 is shown receiving various signals from conventional engine sensors coupled to engine 28 including: measurement of inducted mass airflow (MAF) from mass airflow sensor 32; indication of primary throttle position (TP) from throttle position sensor 34; manifold absolute pressure (MAP), commonly used as an indication of engine load, from pressure sensor 36; engine coolant temperature (T) from temperature sensor 40; indication of engine speed (rpm) from tachometer 42; and output signal EGO from exhaust gas oxygen sensor 44 which, in this particular example, provides an indication of whether exhaust gases are either rich or lean of stoichiometric combustion.

Controller 8 also receives signal HC1 and signal HC2 from respective hydrocarbon sensor 46 positioned upstream of catalytic converter 52 and hydrocarbon sensor 48 positioned downstream of catalytic converter 52. Signal HC1 and signal HC2 provide a measurement of hydrocarbon flow upstream and downstream, respectively, of catalytic converter 52.

In this particular example, engine 28 is shown having EGO sensor 44 coupled to exhaust manifold 50 upstream of catalytic converter 52. Intake manifold 58 of engine 28 is shown coupled to throttle body 54 having primary throttle plate 62 positioned therein. Bypass throttling device 66 is shown coupled to throttle body 54 and includes: bypass conduit 68 connected for bypassing primary throttle plate 62; and solenoid valve 72 for throttling conduit 68 in proportion to the duty cycle of idle speed duty cycle signal ISDC from controller 8. Throttle body 54 is also shown having fuel injector 76 coupled thereto for delivering liquid fuel in proportion to the pulse width of signal fpw from controller 8. Fuel is delivered to fuel injector 76 by a conventional fuel system including fuel tank 80, fuel pump 82, and fuel rail 84.

Figure 2A:
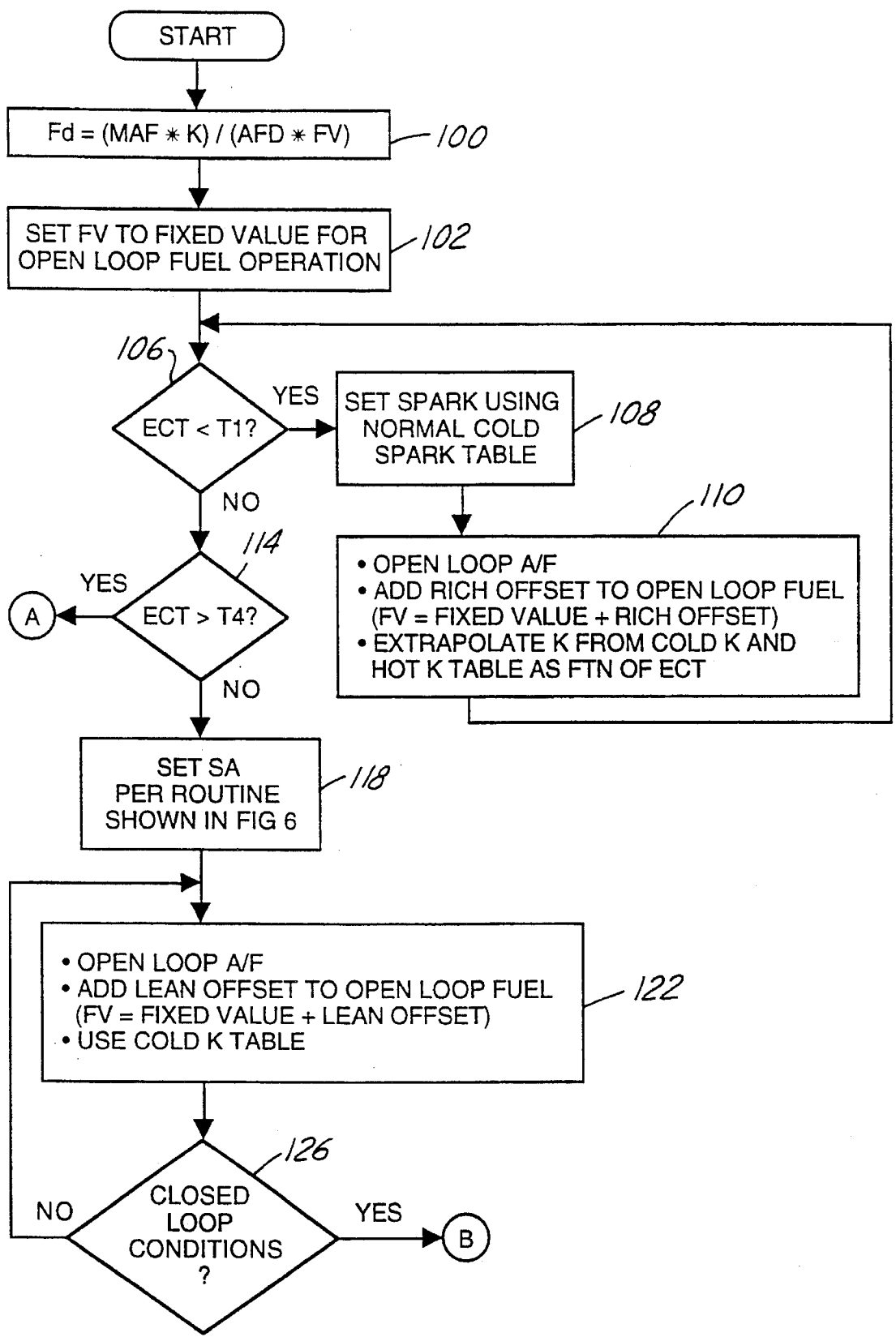
FIGS. 2A–2B, and 3–5 are flow charts of various operations performed by portions of the embodiment shown in FIG. 1.
Figure 2B:
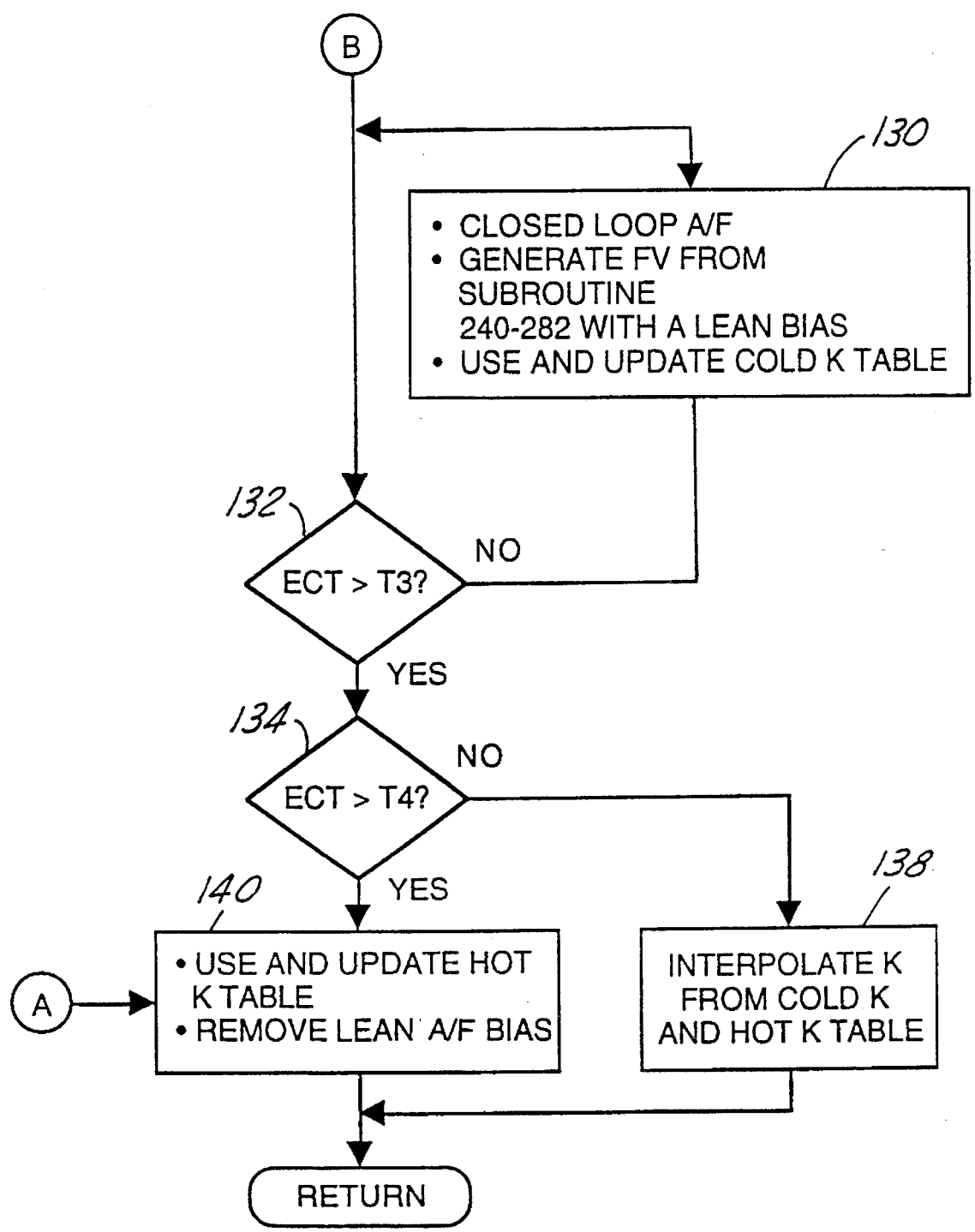

A description of various air/fuel operations performed by controller 8 is now commenced with initial reference to the flow charts shown in FIGS. 2A–2B. During step 100, the fuel command (shown as desired fuel quantity Fd) is calculated by dividing the product of desired air/fuel ratio AFD times feedback variable FV into the product of inducted mass flow measurement MAF times correction value K. In this particular example, desired air/fuel ratio AFD is the stoichiometric value of the fuel blend used which is 14.3 pounds of air per pound of fuel for a low emissions fuel blend. Feedback variable FV and correction value K are each generated by the feedback routines, responsive to EGO sensor 44, which are described latter herein with particular reference to respective FIGS. 3 and 4.

Continuing with FIGS. 2A–2B, feedback variable FV is initially set to a fixed value for open loop air/fuel operation (step 102). Stated another way, desired fuel quantity Fd provides an open loop fuel command which is related to signal MAF and is not adjusted by feedback. In this particular example, feedback variable FV is set to unity which would correspond to operation at desired air/fuel ratio AFD under ideal operating conditions without any engine component aging. It is well known, however, that this open loop operation may not result in engine air/fuel exactly at stoichiometry. Correction by correction value K, however, will be provided as described below.

When engine coolant temperature ECT is less than predetermined temperature T1 (step 106), engine temperature is too low to enter the subroutine for converter warm-up. The subroutine described with reference to steps 108–110 is then entered to minimize the time required to start and reliably warm-up engine 28. In step 108, ignition timing is first set using the cold start table stored in microcomputer 10. Various sub steps are then performed during step 110. Open loop air/fuel operation proceeds by adding a rich offset to desired fuel quantity Fd. In this particular example, feedback variable FV is set to a fixed value less than unity. Correction value K is then extrapolated from two tables stored in microcomputer 10 which store correction K for cold engine operation and hot engine operation, respectively. In this example, the extrapolation occurs as a function of engine coolant temperature ECT.

In the event engine coolant temperature ECT is greater than temperature T1 (step 106), it is compared to temperature T4 (step 114) which is associated with hot engine operation and normal air/fuel ratio control. If engine coolant temperature ECT is less than temperature T4, ignition timing SA is provided as described later herein with particular reference to the routine executed by controller 8 shown in FIG. 5.

Continuing with FIG. 2A, after ignition timing is established, a predetermined lean offset is imposed on desired fuel quantity Fd (step 122). Stated another way, open loop fuel control continues with a lean offset imposed on the open loop fuel quantity commanded so that the exhaust air/fuel ratio is lean of stoichiometry by a preselected amount. In this particular example, the lean offset is provided by setting feedback variable FV to a fixed value and increasing this fixed value by a predetermined amount correlated with the desired lean offset as a function of ECT (step 122). Further, correction value K is read from the table of microcomputer 10 storing cold correction values for a plurality of engine speed and load cells. As described later herein, each correction value K is subsequently generated from closed loop air/fuel feedback control. Also, each correction value K advantageously corrects any error between the open loop lean offset provided by the open loop fuel command and the desired lean shift in air/fuel ratio from stoichiometry.

An advantage of the above described correction is that precise lean air/fuel control and smooth engine operation is obtained which was not heretofore possible with prior art approaches. Because prior art approaches relied on simply an open loop lean shift in air/fuel ratio, the actual lean shift in air/fuel ratio may have been too lean resulting in rough engine operation. This problem is solved as described in more detail below by application of correction value K to the open loop fuel command.

The above described open loop air/fuel operation continues until closed loop conditions are detected in step 126. In this particular example, closed loop air/fuel control is commenced when engine coolant temperature ECT is above a predetermined value, and a readiness check such as temperature of EGO sensor 44 is satisfied. When closed loop air/fuel control is commenced (step 132), feedback variable FV is no longer set to a fixed value plus a lean offset, but is generated in response to EGO sensor 44 as described later herein with particular reference to steps 240–282 of the subroutine shown in FIG. 3. As further described in steps 240–282, feedback variable FV is generated with a lean bias so that engine air/fuel operation will average to a value offset from stoichiometry in the lean direction by a preselected amount. To more closely align the average air/fuel ratio with the preselected lean air/fuel ratio, desired fuel quantity Fd is further corrected by a correction value K for each engine speed load operating range (step 132) provided ECT is not greater than T3 (step 130). And, as described later herein with particular reference to FIG. 4, each correction value K is adaptively learned in response to various signal process steps performed on the output of EGO sensor 44.

The closed loop operation described above with reference to step 132 continues until engine coolant temperature ECT is greater than predetermined temperature T3 (step 130). If engine coolant temperature ECT is greater than temperature T3, but less than temperature T4 (step 134), each correction value K is interpolated from the cold K and hot K tables stored in microcomputer 10 for each engine speed load range (step 138). Other than selection of correction value K, closed loop operation continues as previously described above with particular reference to step 132.

In the event engine coolant temperature ECT is greater than temperature T4 (step 134), each correction value K is selected from the hot K tables of microcomputer 10 (step 140). In addition, a lean air/fuel bias is removed from feedback FV (step 140). Normal air/fuel feedback control is thereby commenced in step 140.

Figure 4:
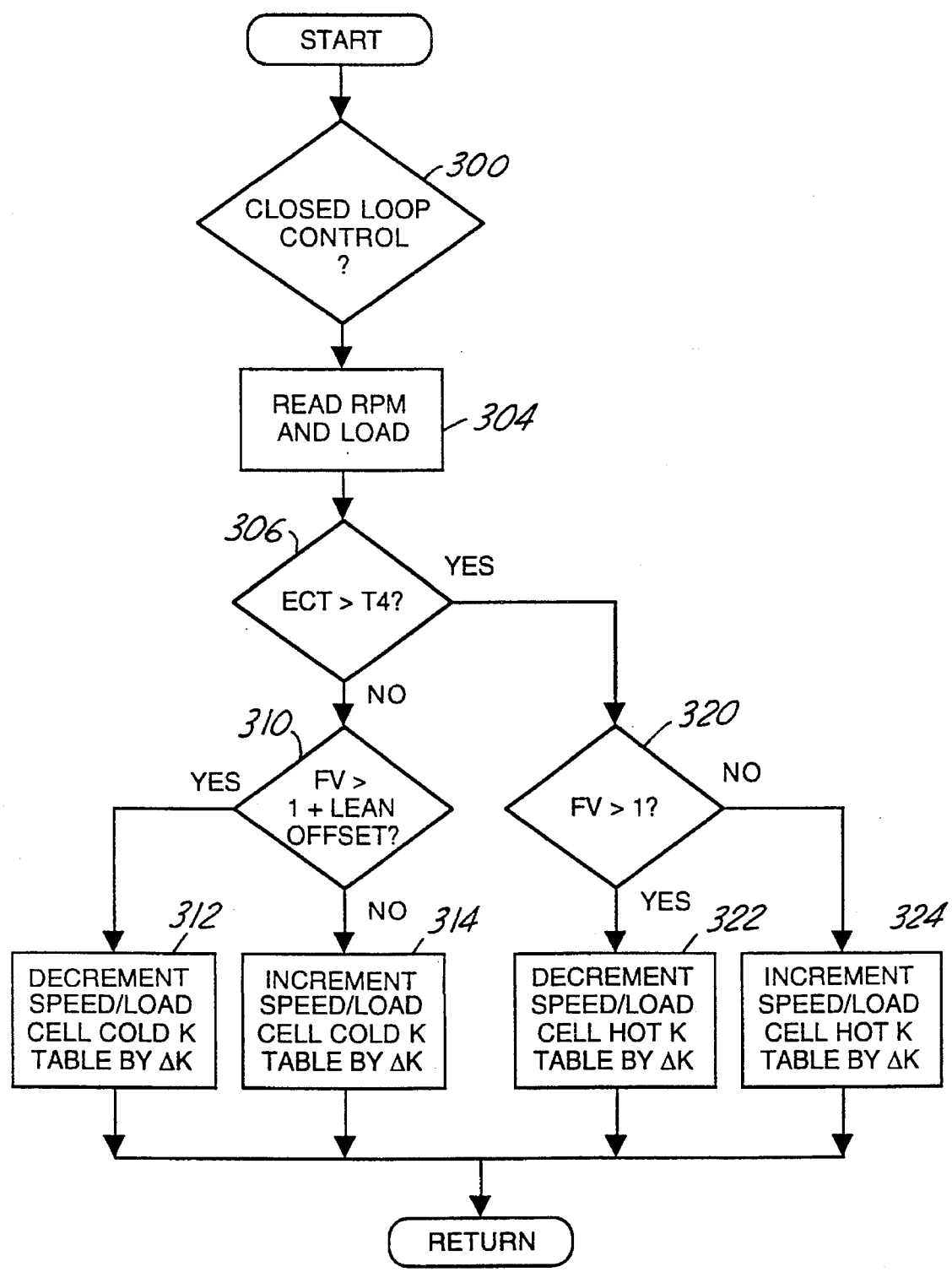

It is noted that correction value K for the hot K table is generated by adaptive learning as described later herein with particular reference to FIG. 4. By generating two sets of correction values (K) for cold and hot engine operation, and either extrapolating (step 110) or interpolating (step 138) between the tables, more accurate air/fuel operation is obtained. Once again, engine air/fuel operation is provided at either stoichiometry or preselected air/fuel ratios lean of stoichiometry by a preselected amount far more accurately than heretofore possible. Emissions are thereby minimized and overly lean operation which may result in engine stumble is avoided.

The air/fuel feedback subroutine executed by controller 8 to generate fuel feedback variable FV is now described with reference to the flowchart shown in FIG. 3. A determination is first made that closed loop (i.e., feedback) air/fuel control is desired in step 240 in the same manner as previously described herein with reference to step 126 in FIGS. 2A–2B. Next, the subroutine determines whether feedback variable FV should be biased in step 244. In the event bias is not required, integral term $\Delta i$ is set equal to integral term $\Delta j$, and proportional term Pi is set equal to proportional term Pj (step 246). Thus, the integration and proportional steps of the PI controller described above are set equal so that the resulting feedback variable FV has no bias.

On the other hand, when a bias is required (step 244), the integral and proportional terms are selected to provide the desired bias (step 248). For example, in the event a lean bias is required as provided in previously described step 130 in FIGS. 2A–2B, proportional term Pi is made greater than proportional term Pj and/or integral term $\Delta i$ is made greater than integral term $\Delta j$ by a percentage necessary to achieve the desired bias. Stated another way, when the integral and proportional terms in the lean (i) direction and rich (j) direction are made equal, feedback variable FV will average to unity. Thus, the engine air/fuel ratio achieves an average at desired air/fuel ratio AFD. On the other hand, when the integral and proportional terms in the lean (i) direction are made greater than in the rich (j) direction, feedback variable FV will average to a value greater than unity by an amount determined by these terms. Thus, a desired lean bias in the air/fuel ratio is achieved.

Figure 3:
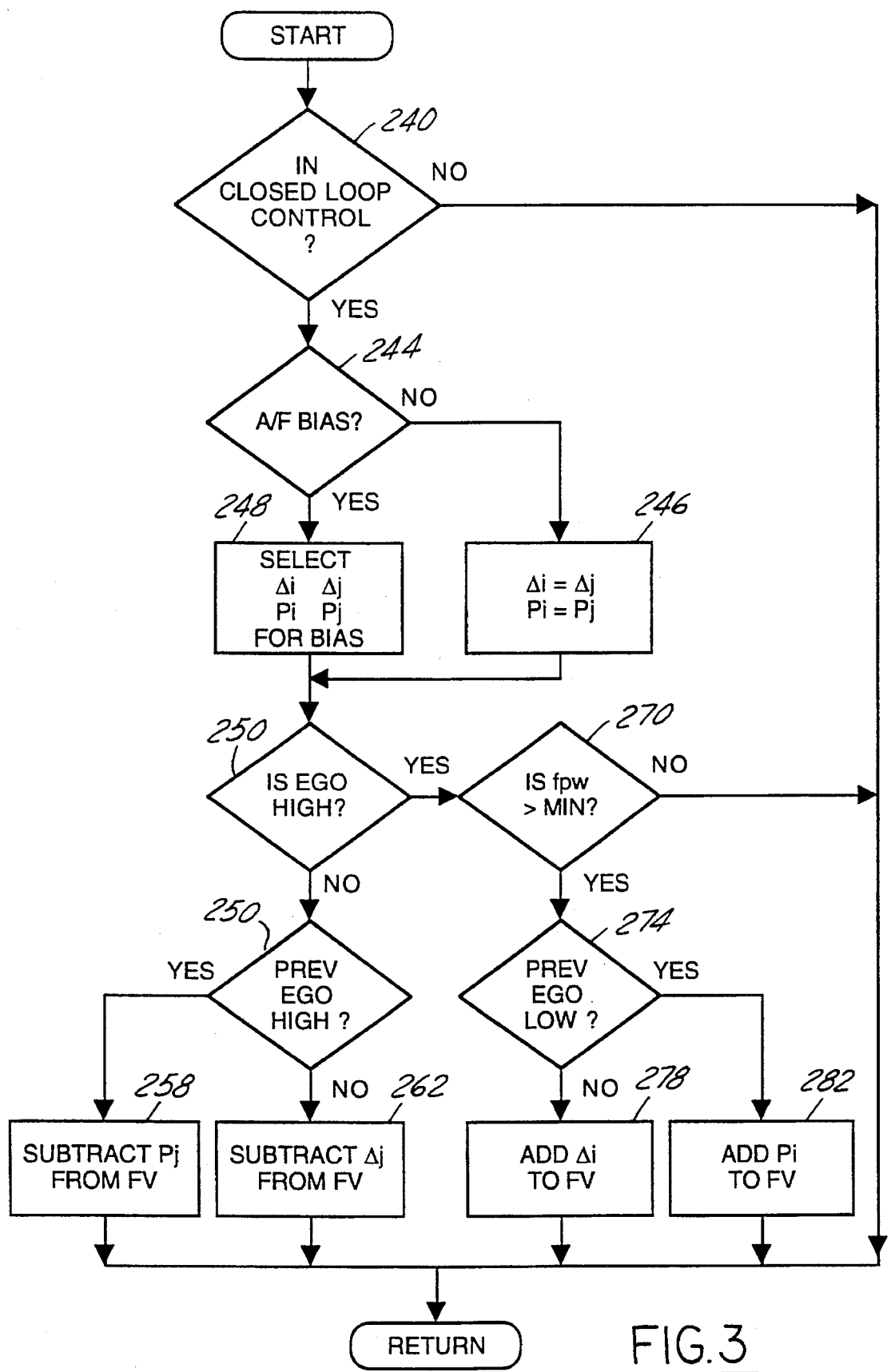

The specific manner in which the proportional and integral terms generate feedback variable FV is now described with respect to steps 250–282 of the subroutine shown in FIG. 3. EGO sensor 44 is sampled in step 250 during each background loop of controller 8. When EGO sensor 44 is low (i.e., lean), but was high (i.e., rich) during the previous background loop (step 254), proportional term Pj is subtracted from signal FV in step 258. When EGO sensor 44 is low, and was also low during the previous background loop, integral term $\Delta j$ is subtracted from signal FV in step 262. Accordingly, in this particular example of operation, proportional term Pj represents a predetermined rich correction which is applied when EGO sensor 44 switches from rich to lean. Integral term $\Delta j$ represents an integration step to provide continuously increasing rich fuel delivery when EGO sensor 44 continues to indicate combustion lean of stoichiometry.

When fpm is greater than a minimum value MIN (step 270) and when EGO sensor 44 is high but was low during the previous background loop (step 274), proportional term Pi is added to signal FV in step 282. When EGO sensor 44 is high, and was also high during the previous background loop, integral term $\Delta i$ is added to signal FV in step 278. Proportional term Pi represents a proportional correction in a direction to decrease fuel delivery when EGO sensor 44 switches from lean to rich. Integral term $\Delta i$ represents an integration step in a fuel decreasing direction while EGO sensor 44 continues to indicate combustion rich of stoichiometry.

The adaptive learning subroutine for learning correction value K during both cold engine and hot engine operation is now described with reference to the flowchart shown in FIG. 4. Operation for entering closed loop air/fuel control is first determined in step 300 in a similar manner to that previously described with reference to step 126 in FIGS. 2A–2B. Engine speed and load are then read during step 304 and the correction values generated below stored in tables for each speed load range.

When engine coolant temperature ECT is less than temperature T4 (step 306) and also less than F3 the cold K tables are updated as now described. If feedback variable FV is greater than its nominal value (unity in this example) plus the lean offset introduced as previously described with reference to FIGS. 2A–2B (step 310), then the cold K table speed/load cell is decremented by $\Delta K$ (step 312). On the other hand, if feedback variable FV is less than unity plus the lean offset (step 310), the corresponding speed/load cell in the cold K table incremented by $\Delta K$ (step 314).

Operation proceeds in a similar manner to adaptively learn correction value K during hot engine operation when engine coolant temperature ECT is greater than temperature T4 (step 306). More specifically, when feedback variable FV is greater than unity (step 320), the speed/load cell of the hot K table is decremented by $\Delta K$ (step 322). Similarly, when feedback variable FV is less than unity (step 320), the speed/load cell of the hot K table is incremented by $\Delta K$ (step 324).

The subroutine described above with respect to FIG. 4 provides an adaptive learning of the difference or error between actual engine air/fuel operation and the desired air/fuel ratio. It is also operable when the desired air/fuel ratio is offset from stoichiometry by a preselected offset.

The previously described lean air/fuel operation reduces the warm-up period of catalytic converter 52 thereby reducing engine emissions. The ignition retard schedule described later herein with reference to FIG. 5, also decreases the warm-up time for catalytic converter 52. These operations are performed more accurately than heretofore possible. For example, adaptive learning of correction factor K during hot and cold operation enables precise air/fuel control at any desired air/fuel ratio including a lean offset ratio.

Figure 5:
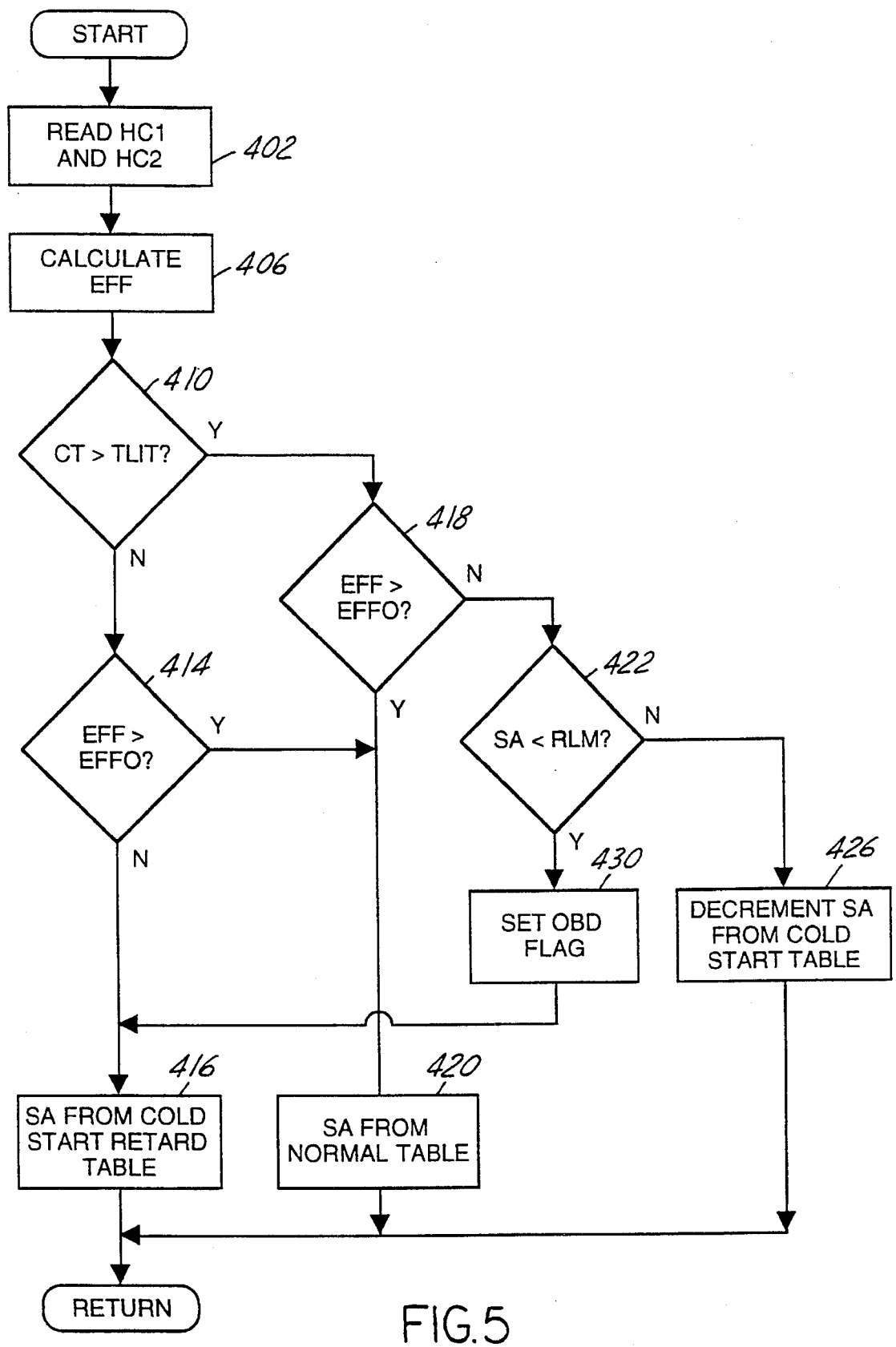

Referring now to FIG. 5, the routine executed by controller 8 for retarding ignition timing (SA) to achieve more rapid warm-up of catalytic converter 52 is now described. Signal HC1 and signal HC2 are read from respective hydrocarbon sensors 46 and 48 positioned, respectively, upstream and downstream of converter 52 (step 402). The efficiency of catalytic converter 52 is then calculated at 406 by calculating a ratio of the integral of signal HC2 to the integral of signal HC1.

If the temperature, or an inference of the temperature, of catalytic converter 52 is less than a reference temperature TLIT associated with desired converter efficiency as shown at step 410, and converter efficiency EFF is less than desired efficiency EFF0 (step 414), then engine ignition timing (SA) is provided from a cold start retard table (416). The cold start retard table provides a preselected schedule of retarded ignition timing to achieve rapid warm-up of converter 52.

If converter temperature CT is greater than reference temperature TLIT (410), and converter efficiency is calculated as being greater than desired efficiency EFF0 (418), ignition timing (SA) is read from the normal ignition timing table at 420. On the other hand, when calculated efficiency EFF is less than desired efficiency EFF0 (418), and ignition timing (SA) is greater than limit LM for ignition retard during cold start (422), ignition timing (SA) from the cold start table is decremented by a preselected amount at 426. If, however, ignition timing has reached retard limit LM (422), onboard diagnostics flag OBD is set (430), and the ignition timing (SA) is read from the cold start table (416).

Although one example of an embodiment which practices the invention has been described herein, there are numerous other examples which could also be described. For example, analog devices, or discreet IC's may be used to advantage rather than a microcomputer. Further, proportional rather than two-state exhaust gas oxygen sensors may be used to advantage. The invention is therefore to be defined only in accordance with the following claims.

What is claimed:

1. A control method for an internal combustion engine having its exhaust coupled to a catalytic converter, comprising the steps of:

providing an indication of hydrocarbons downstream of said converter;

calculating hydrocarbon efficiency of said converter from said hydrocarbon indication;

providing an indication of low catalytic converter efficiency; and retarding ignition timing to a value retarded from nominal ignition timing during said indication of low catalytic converter efficiency and advancing said ignition timing back towards said nominal timing when said calculated hydrocarbon efficiency reaches a desired efficiency.

2. The method recited in claim 1 further comprising a step of further retarding said ignition timing from said retarded value when an indication of converter temperature is less than a preselected temperature.

3. A control method for an internal combustion engine having its exhaust coupled to a catalytic converter, comprising the steps of:

providing an indication of hydrocarbons downstream of said converter;

calculating hydrocarbon efficiency of said converter from said hydrocarbon indication wherein said step of calculating converter efficiency is further responsive to an indication of hydrocarbons upstream of the converter; and retarding ignition timing to a value retarded from nominal ignition timing when said calculated hydrocarbon efficiency is less than a desired efficiency.

4. A control method for an internal combustion engine having its exhaust coupled to a catalytic converter, comprising the steps of:

providing an indication of hydrocarbons downstream of said converter;

calculating hydrocarbon efficiency of said converter from said hydrocarbon indication wherein said step of calculating converter efficiency is further responsive to an indication of hydrocarbons upstream of the converter and wherein said step of calculating converter efficiency further comprises a step of calculating a ratio of an integral of said downstream hydrocarbon indication to an integral of said upstream hydrocarbon indication; and retarding ignition timing to a value retarded from nominal ignition timing when said calculated hydrocarbon efficiency is less than a desired efficiency.

5. A control method for an internal combustion engine having its exhaust coupled to a catalytic converter, comprising the steps of:

providing an indication of hydrocarbons downstream of said converter;

calculating hydrocarbon efficiency of said converter from said hydrocarbon indication;

retarding ignition timing to a value retarded from nominal ignition timing when said calculated hydrocarbon efficiency is less than a desired efficiency;

offsetting a mixture of air and fuel inducted into the engine by a predetermined amount in a lean direction to shift engine exhaust gas mixture towards an air/fuel ratio lean of stoichiometry by a preselected amount;

correcting said predetermined air/fuel mixture offset by a correction value so that said exhaust gas mixture is shifted more closely to said lean offset from stoichiometry;

adjusting said inducted air/fuel mixture in response to a feedback variable derived by integrating an output of an exhaust gas oxygen sensor to maintain said exhaust gas mixture at said preselected offset from stoichiometry during said period; and adaptively learning said correction value by comparing said feedback variable to a reference value.

6. A control system for an internal combustion engine having its exhaust coupled to a catalytic converter, comprising:

a first and a second hydrocarbon sensor respectively positioned upstream and downstream of the converter;

a controller calculating hydrocarbon efficiency of the converter from output signals from said first and said second hydrocarbon sensors;

said controller retarding ignition timing to a value retarded from nominal ignition timing when said calculated hydrocarbon efficiency is less than a desired efficiency; and said controller offsetting a fuel command for delivering fuel to the engine by a predetermined amount in a lean direction during a period after engine start to shift engine exhaust gas mixture towards a preselected air/fuel ratio lean of stoichiometry by a preselected amount.

7. The method recited in claim 6 wherein said step of calculating converter efficiency further comprises a step of calculating a ratio of an integral of said downstream hydrocarbon indication to an integral of said upstream hydrocarbon indication.

8. The control system recited in claim 6 wherein said period comprises a first portion and a later occurring second portion, said controller adaptively learning said correction value during said second portion of said period from a feedback signal derived from said exhaust gas oxygen sensor and correcting said offset fuel command by said correction value so that said exhaust gas mixture is shifted more closely to said preselected air/fuel ratio.

9. The control system recited in claim 8 further comprising feedback means for adjusting said fuel command in response to said feedback signal to maintain said exhaust gas mixture at said preselected air/fuel ratio during said second portion of said period and to maintain said exhaust gas mixture at stoichiometry after termination of said period.

* * * * *